US011579234B2

(12) United States Patent
Moran et al.

(10) Patent No.: US 11,579,234 B2
(45) Date of Patent: Feb. 14, 2023

(54) INTERFEROMETRIC DIRECTION-FINDING ANTENNA ARRAY WITH MULTIPLEXED/SWITCHED RADIATING ELEMENTS

(71) Applicant: Rockwell Collins, Inc., Cedar Rapids, IA (US)

(72) Inventors: Jiwon L. Moran, Marion, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 536 days.

(21) Appl. No.: 16/530,082

(22) Filed: Aug. 2, 2019

(65) Prior Publication Data
US 2021/0349173 A1 Nov. 11, 2021

(51) Int. Cl.
*G01S 3/46* (2006.01)
*G01S 3/36* (2006.01)
*H01Q 21/29* (2006.01)

(52) U.S. Cl.
CPC .............. *G01S 3/465* (2013.01); *G01S 3/36* (2013.01); *H01Q 21/293* (2013.01)

(58) Field of Classification Search
CPC ......... G01S 3/465; G01S 3/36; H01Q 21/293; H01Q 21/14; H01Q 21/20
See application file for complete search history.

(56) References Cited

U.S. PATENT DOCUMENTS

| 6,646,614 | B2 | 11/2003 | Killen |
| 7,477,192 | B1* | 1/2009 | Haff ......................... G01S 3/74 342/434 |

(Continued)

FOREIGN PATENT DOCUMENTS

| JP | S61270904 A | 12/1986 | |
| WO | WO-2011112084 A1 * | 9/2011 | ........... H01Q 21/061 |

OTHER PUBLICATIONS

Henault et al., "Effects of Mutual Coupling on the Accuracy of Adcock Direction Finding Systems", IEEE Transactions on Aerospace and Electronic Systems, vol. 48, No. 4, Oct. 2012 (Year: 2012).*

(Continued)

*Primary Examiner* — Timothy A Brainard
*Assistant Examiner* — Hailey R Le
(74) *Attorney, Agent, or Firm* — Suiter Swantz pc llo

(57) ABSTRACT

A direction-finding antenna includes at least a first set of radiating elements configured to radiate at least a first wavelength ($\lambda_1$) and a second set of radiating elements configured to radiate at a second wavelength ($\lambda_2$) that is shorter than the first wavelength ($\lambda_1$). The first set of radiating elements defines a first circle having a first radius. The second set of radiating elements defines a second circle having a second radius that is smaller than the first radius of the first circle. The direction-finding antenna further includes a transmission line-based multiplexer configured to selectively couple the first set of radiating elements or the second set of radiating elements to a radio frequency (RF) feed line, or a plurality of switches configured to selectively couple selected radiating elements of the first set of radiating elements or the second set of radiating elements to the RF feed line.

20 Claims, 5 Drawing Sheets

(56) References Cited

U.S. PATENT DOCUMENTS

| | | | |
|---|---|---|---|
| 7,907,098 B1 | 3/2011 | West | |
| 8,952,843 B1* | 2/2015 | West | G01S 7/021 |
| | | | 342/156 |
| 9,229,102 B1* | 1/2016 | Wright | G01S 13/885 |
| 2003/0085846 A1* | 5/2003 | Killen | H01Q 5/40 |
| | | | 343/844 |
| 2004/0155817 A1* | 8/2004 | Kingsley | H01Q 21/24 |
| | | | 343/700 MS |
| 2011/0304507 A1* | 12/2011 | Mujahed | H01Q 1/28 |
| | | | 342/417 |
| 2014/0232572 A1* | 8/2014 | Sharawi | H01Q 9/16 |
| | | | 340/993 |
| 2018/0090849 A1* | 3/2018 | Bermeo | H01Q 13/04 |
| 2020/0091616 A1* | 3/2020 | Bosser | H01Q 21/22 |

OTHER PUBLICATIONS

Extended Search Report for European Application No. 20189162.9 dated Dec. 14, 2020, 12 pages.

Simon Henault et al: "Effects of Mutual Coupling on the Accuracy of Adcock Direction Finding Systems", IEEE Transactions on Aerispace and Electroinic Systems, IEEE Service Center, Piscataway, NJ, US, vol. 48, No. 4, Oct. 1, 2012 (Oct. 1, 2012) pp. 2990-3005, XP011467223, ISSN: 0018-9251, DOI: 10.1109/TAES.2012/6324673.

* cited by examiner

INTERFEROMETRIC DIRECTION-FINDING ANTENNA ARRAY WITH MULTIPLEXED/SWITCHED RADIATING ELEMENTS

BACKGROUND

Direction-finding antennas may be utilized in GPS-denied situations. In these situations, Pseudo-Doppler or interferometry techniques can be used for navigation. Pseudo-Doppler techniques require complex and expensive antenna systems. On the other hand, interferometry techniques employ simple antenna structures but require omni-directional antennas, typically resulting in the use of high-profile dipole antennas that can be easily targeted by adversaries and have limited bandwidth (e.g., <10%). In order to achieve an improved interferometric direction-finding system, there is a need for a low profile, broadband, omni-directional antenna that can change its phase center with frequency.

SUMMARY

A direction-finding antenna is disclosed, in accordance with one or more embodiments. The direction-finding antenna includes a first set of radiating elements configured to radiate at a first wavelength ($\lambda_1$) and a second set of radiating elements configured to radiate at a second wavelength ($\lambda_2$) that is shorter than the first wavelength ($\lambda_1$). The first set of radiating elements may define a first circle having a first radius with a first phase center distance between about $0.15\lambda_1$ and $0.20\lambda_1$, and the second set of radiating elements may define a second circle having a second radius with a second phase center distance between about $0.15\lambda_2$ and $0.20\lambda_2$. In embodiments, the second radius of the second circle may be smaller than the first radius of the first circle, and the second set of radiating elements may include smaller radiating elements than the first set of radiating elements. The direction-finding antenna may further include a transmission line-based multiplexer coupled to the first set of radiating elements and the second set of radiating elements. The transmission line-based multiplexer may be configured to selectively couple the first set of radiating elements or the second set of radiating elements to a radio frequency (RF) feed line.

In some embodiments of the direction-finding antenna, the direction-finding antenna further includes a third set of radiating elements configured to radiate at a third wavelength ($\lambda_3$) that is shorter than the second wavelength ($\lambda_2$). The third set of radiating elements may define a third circle having a third radius with a third phase center distance between about $0.15\lambda_3$ and $0.20\lambda_3$. In embodiments, the third radius of the third circle may be smaller than the second radius of the second circle, and the third set of radiating elements may include smaller radiating elements than the second set of radiating elements.

In some embodiments of the direction-finding antenna, the transmission line-based multiplexer is further coupled to the third set of radiating elements, and the transmission line-based multiplexer is configured to selectively couple the first set of radiating elements, the second set of radiating elements, or the third set of radiating elements to the RF feed line.

In some embodiments of the direction-finding antenna, the direction-finding antenna further includes at least one additional set of radiating elements configured to radiate at an additional wavelength ($\lambda_n$) that is shorter than the third wavelength ($\lambda_3$). The additional set of radiating elements may define an additional circle having an additional radius with an additional phase center distance between about $0.15\lambda_n$ and $0.20\lambda_n$. The additional radius of the additional circle may be smaller than the third radius of the third circle, and the additional set of radiating elements may include smaller radiating elements than the third set of radiating elements. In embodiments, the number of additional sets (n) may be limited by the size and type/geometry of the direction-finding antenna.

In some embodiments of the direction-finding antenna, the transmission line-based multiplexer is further coupled to the additional set of radiating elements, and the transmission line-based multiplexer is configured to selectively couple the first set of radiating elements, the second set of radiating elements, the third set of radiating elements, or the additional set of radiating elements to the RF feed line.

In some embodiments of the direction-finding antenna, the radiating elements may be circular disk (C-disk) antenna elements.

In some embodiments of the direction-finding antenna, the radiating elements may be monopole or monopole-like antenna elements.

In some embodiments of the directions finding-antenna, the radiating element may be dielectric resonator antennas.

In some embodiments of the direction-finding antenna, the first set of radiating elements are a first type of antenna element, and the second set of radiating elements are a second type of antenna element different from the first type of antenna element.

In some embodiments of the direction-finding antenna, the direction-finding antenna is a communications antenna.

In some embodiments of the direction-finding antenna, the direction-finding antenna is a multi-function antenna that is reconfigurable between omnidirectional mode and a commutated quadrant sectored North (N)/South (s)/East (E)/West (W) mode.

A direction-finding antenna is also disclosed, in accordance one or more additional embodiments. The direction-finding antenna includes a first set of radiating elements configured to radiate at a first wavelength ($\lambda_1$) and a second set of radiating elements configured to radiate at a second wavelength ($\lambda_2$) that is shorter than the first wavelength ($\lambda_1$). The first set of radiating elements may define a first circle having a first radius with a first phase center distance between about $0.15\lambda_1$ and $0.20\lambda_1$, and the second set of radiating elements may define a second circle having a second radius with a second phase center distance between about $0.15\lambda_2$ and $0.20\lambda_2$. In embodiments, the second radius of the second circle may be smaller than the first radius of the first circle, and the second set of radiating elements may include smaller radiating elements than the first set of radiating elements. The direction-finding antenna may further include a plurality of switches coupled to respective radiating elements of the first set of radiating elements and the second set of radiating elements. The switches may be configured to selectively couple selected radiating elements of the first set of radiating elements or the second set of radiating elements to a radio frequency (RF) feed line.

In some embodiments of the direction-finding antenna, the direction-finding antenna further includes a third set of radiating elements configured to radiate at a third wavelength ($\lambda_3$) that is shorter than the second wavelength ($\lambda_2$). The third set of radiating elements may define a third circle having a third radius with a third phase center distance between about $0.15\lambda_3$ and $0.20\lambda_3$. In embodiments, the third radius of the third circle may be smaller than the second radius of the second circle, and the third set of radiating elements may include smaller radiating elements than the second set of radiating elements.

In some embodiments of the direction-finding antenna, the switches are further coupled to respective radiating elements of the third set of radiating elements, and the switches are configured to selectively couple selected radiating elements of the first set of radiating elements, the second set of radiating elements, or the third set of radiating elements to the RF feed line.

In some embodiments of the direction-finding antenna, the direction-finding antenna further includes at least one additional set of radiating elements configured to radiate at an additional wavelength ($\lambda_n$) that is shorter than the third wavelength ($\lambda_3$). The additional set of radiating elements may define an additional circle having an additional radius with an additional phase center distance between about $0.15\lambda_n$ and $0.20\lambda_n$. The additional radius of the additional circle may be smaller than the third radius of the third circle, and the additional set of radiating elements may include smaller radiating elements than the third set of radiating elements.

In some embodiments of the direction-finding antenna, the switches are further coupled to respective radiating elements of the additional set of radiating elements, and the switches are configured to selectively couple selected radiating elements of the first set of radiating elements, the second set of radiating elements, the third set of radiating elements, or the additional set of radiating elements to the RF feed line.

In some embodiments of the direction-finding antenna, the radiating elements may be circular disk (C-disk) antenna elements.

In some embodiments of the direction-finding antenna, the radiating elements may be monopole or monopole-like antenna elements.

I some embodiments of the direction-finding antenna, the radiating elements may be dielectric resonator antennas.

In some embodiments of the direction-finding antenna, the switches may be or may include micro-electromechanical system (MEMS) switches, p-i-n junction (PIN) diodes, and/or transistors.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
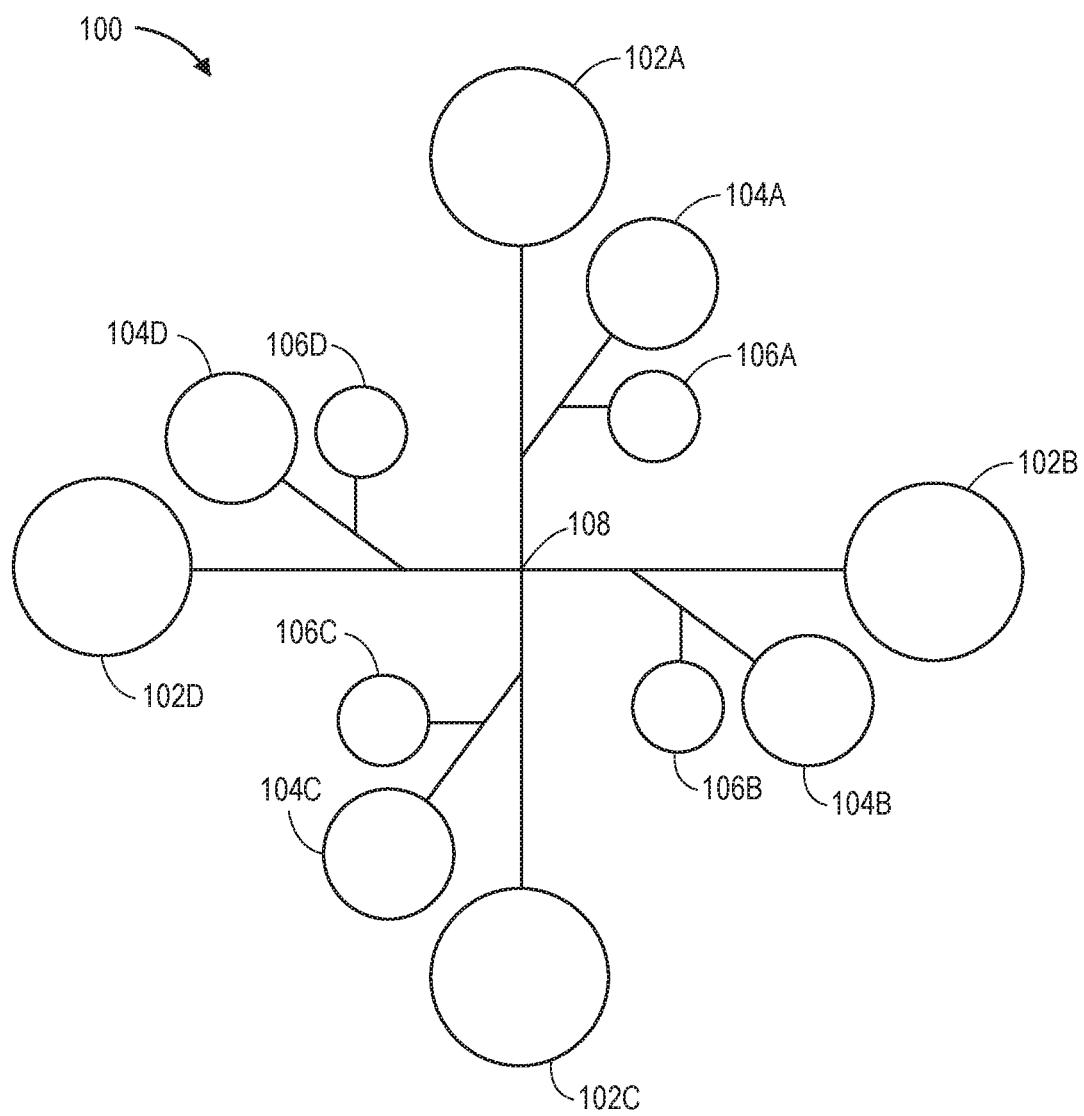
FIG. 1 is a block diagram illustrating a direction-finding antenna, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An interferometric direction-finding antenna with multiplexed/switched monopole or monopole-like radiating elements (e.g., circular disk (c-Disk) antenna elements, or the like) is disclosed. Direction-finding antennas may be utilized for navigation in GPS-denied situations. Interferometry is a desirable technique for direction finding because it employs simple antenna structures. However, interferometry directfinding techniques require omni-directional antennas, typically resulting in the use of high-profile dipole antennas that can be easily targeted by adversaries and have limited bandwidth (e.g., <10%). To overcome these shortfalls of the current systems, the interferometric direction-finding antenna disclosed herein employs a network of switched/multiplexed monopole or monopole-like radiating elements (e.g., circular disk (c-Disk) antenna elements, or the like) in order to maintain a low-profile structure for a broadband, omni-directional antenna that can change its phase center with frequency.

FIG. 1 illustrates an embodiment of a direction-finding antenna 100 including multiple sets radiating elements in an omni-directional configuration. In some embodiments, the radiating elements (e.g., radiating elements 102, 104, 106, etc.) may be circular disk (c-Disk) antenna elements, such as the radiating elements described in U.S. Pat. No. 7,909,098, "LOG PERIODIC ANTENNA," by James B. West, which is incorporated herein by reference in its entirety. Alternatively, the radiating elements (e.g., radiating elements 102, 104, 106, etc.) may include any other monopole or monopole-like antenna elements having a low-profile structure. For example, other types of radiating elements that may be utilized are described in U.S. patent application Ser. No. 15/624,147, "INTERFEROMETRIC DIRECTION FINDING ANTENNA," by Jiwon L. Moran et al., which is incorporated herein by reference in its entirety. Examples of other monopole or monopole-like antenna elements having a low-profile structure include, but are not limited to, inverted F antennas, inverted F antennas in a puck, layered c-Disk or printed circuit board (PCB) elements, serpentine or distorted log periodic (LP) elements, serpentine c-Disk elements, local cavity antennas, or the like. Dielectric resonator antennas are also attractive since they are volumetrically small as a function of wavelength.

In embodiments, the direction-finding antenna 100 includes at least a first set of radiating elements 102 (e.g., elements 102A, 102B, 102C, and 102D) configured to radiate at a first wavelength ($\lambda_1$) and a second set of radiating elements 104 (e.g., elements 104A, 104B, 104C, and 104D) configured to radiate at a second wavelength ($\lambda_2$) that is shorter than the first wavelength ($\lambda_1$). The first set of radiating elements 102 may define a first circle having a first radius with a first phase center distance between about $0.15\lambda_1$ and $0.20\lambda_1$. For example, radiating elements 102A, 102B, 102C, and 102D may be distributed along an outermost circle, equidistantly from one another. The second set of radiating elements 104 may define a second circle having a second radius with a second phase center distance between about $0.15\lambda_2$ and $0.20\lambda_2$. In embodiments, the second radius of the second circle may be smaller than the first radius of the first circle. For example, radiating elements 104A, 104B, 104C, and 104D may be distributed, equidistantly from one another, along another circular path that is inside the outermost circle formed by the first set of radiating elements 102. In addition, the second set of radiating elements 104 may include smaller radiating elements (e.g., c-Disk antenna elements having smaller diameters) than the first set of radiating elements 102.

In some embodiments, the direction-finding antenna 100 may further include a third set of radiating elements 106 (e.g., elements 106A, 106B, 106C, and 106D) configured to radiate at a third wavelength ($\lambda_3$) that is shorter than the second wavelength ($\lambda_2$). The third set of radiating elements 106 may define a third circle having a third radius with a third phase center distance between about $0.15\lambda_3$ and $0.20\lambda_3$. In embodiments, the third radius of the third circle may be smaller than the second radius of the second circle. For example, radiating elements 106A, 106B, 106C, and 106D may be distributed, equidistantly from one another, along another circular path that is inside the circle formed by the second set of radiating elements 104. In addition, the third set of radiating elements 106 may include smaller radiating elements (e.g., c-Disk antenna elements having smaller diameters) than the second set of radiating elements 104.

The direction-finding antenna 100 may include any number of radiating elements that are configured in a similar fashion to the radiating elements 102, 104, and 106 described above. For example, in embodiments, the direction-finding antenna 100 may further include at least one additional (e.g., fourth, fifth, . . . , $n^{th}$) set of radiating elements configured to radiate at an additional wavelength (e.g., $\lambda_4, \lambda_5, \ldots, \lambda_n$) that is shorter than the third wavelength ($\lambda_3$), and so forth. The additional set of radiating elements may define an additional (e.g., fourth, fifth, . . . , $n^{th}$) circle having an additional radius with an additional phase center distance between about $0.15\lambda_n$ and $0.20\lambda_n$. In embodiments, the radius of the additional (e.g., fourth, fifth, . . . , $n^{th}$) circle may be smaller than the third radius of the third circle. For example, radiating elements of the additional (e.g., fourth, fifth, . . . , $n^{th}$) set of radiating elements may be distributed, equidistantly from one another, along another circular path that is inside the circle formed by the third set of radiating elements 106, and so forth. In addition, the additional (e.g., fourth, fifth, . . . , $n^{th}$) set of radiating elements may include smaller radiating elements (e.g., c-Disk antenna elements having smaller diameters) than the third set of radiating elements 106. The number of additional sets (n) may be limited by the size and type/geometry of the direction-finding antenna. Higher frequency monopole variants can help; however, the ring radius may eventually become too small at upper microwave/millimeter wave frequencies.

The foregoing embodiments illustrate the general structure of the direction-finding antenna 100, where sets of radiating elements making up the direction-finding antenna 100 define a plurality of circles, ellipses, or other loop structures that decrease in size from the outermost loop defined by the outermost set of radiating elements to the innermost loop defined by the innermost set of radiating elements. In embodiments, the respective sizes of the radiating elements also decrease in size from the outermost loop defined by the outermost set of radiating elements to the innermost loop defined by the innermost set of radiating elements. The radiating wavelength also decreases from the outermost loop defined by the outermost set of radiating elements to the innermost loop defined by the innermost set of radiating elements. Meanwhile, the operating frequency or frequency band increases from the outermost loop defined by the outermost set of radiating elements to the innermost loop defined by the innermost set of radiating elements.

Figure 2:
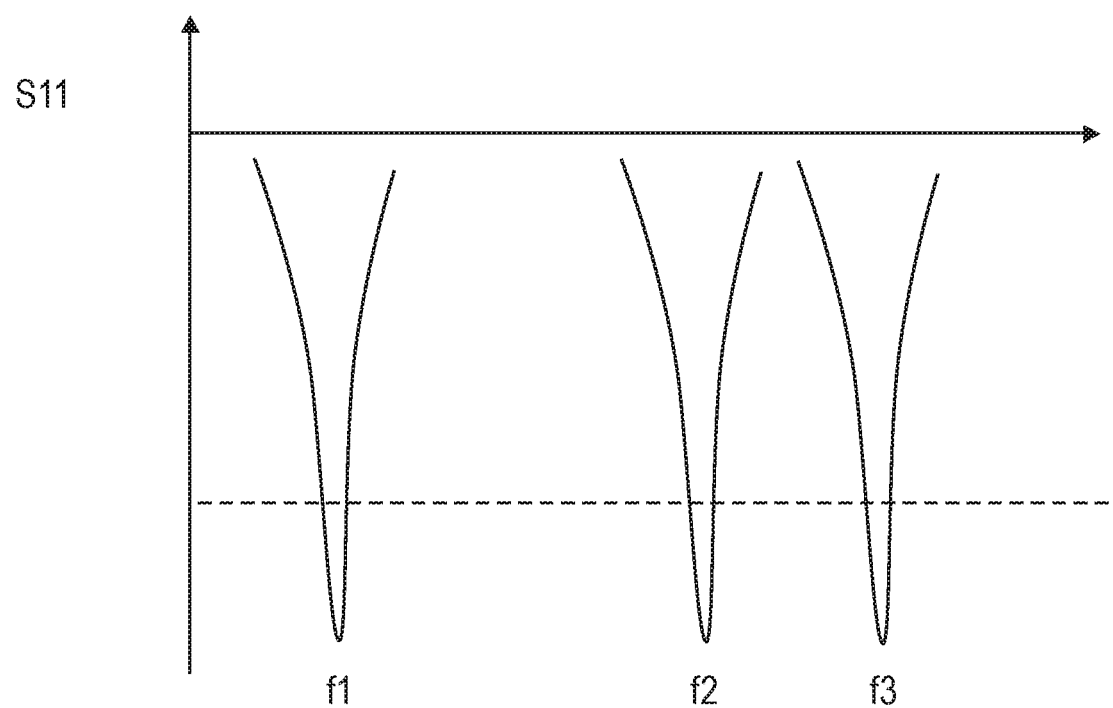
FIG. 2 is a graphical plot of impedance matching at selected frequencies for a direction-finding antenna, such as the direction-finding antenna illustrated in FIG. 1, in accordance with one or more embodiments of this disclosure.

FIG. 2 is graphical plot illustrating an example of the impedance matching at selected operating frequencies of the direction-finding antenna 100. For an arbitrary number of frequencies (e.g., $f_1, f_2, \ldots, f_n$), the spacing between sets of radiating elements (e.g., radiating elements 102, 104, 106, etc.) may be sufficient to prevent crosstalk/interference between the different sets. For example, the spacing may be at least $\lambda/2$ (e.g., at least $(\lambda_1)/2$ spacing between radiating elements 102 and 104, at least $(\lambda_2)/2$ spacing between radiating elements 104 and 106, and so on). The radiating elements (e.g., radiating elements 102, 104, 106, etc.) of the different sets may also be offset from one another. For example, FIG. 1 illustrates radiating elements 104A, 104B, 104C, and 104D having both x and y offsets from respective ones of radiating elements 102A, 102B, 102C, and 102D. Similarly, radiating elements 106A, 106B, 106C, and 106D may have x and y offsets from respective ones of radiating elements 104A, 104B, 104C, and 104D, and so forth. In some embodiments, with meander interconnect structures, the radiating center can maintain a phase center of above $0.15\lambda$ to $0.2\lambda$. Band-stop filter structures may also be introduced/included in the direction-finding antenna 100 (e.g., between the sets of radiating elements 102, 104, 106, etc.).

Figure 3:
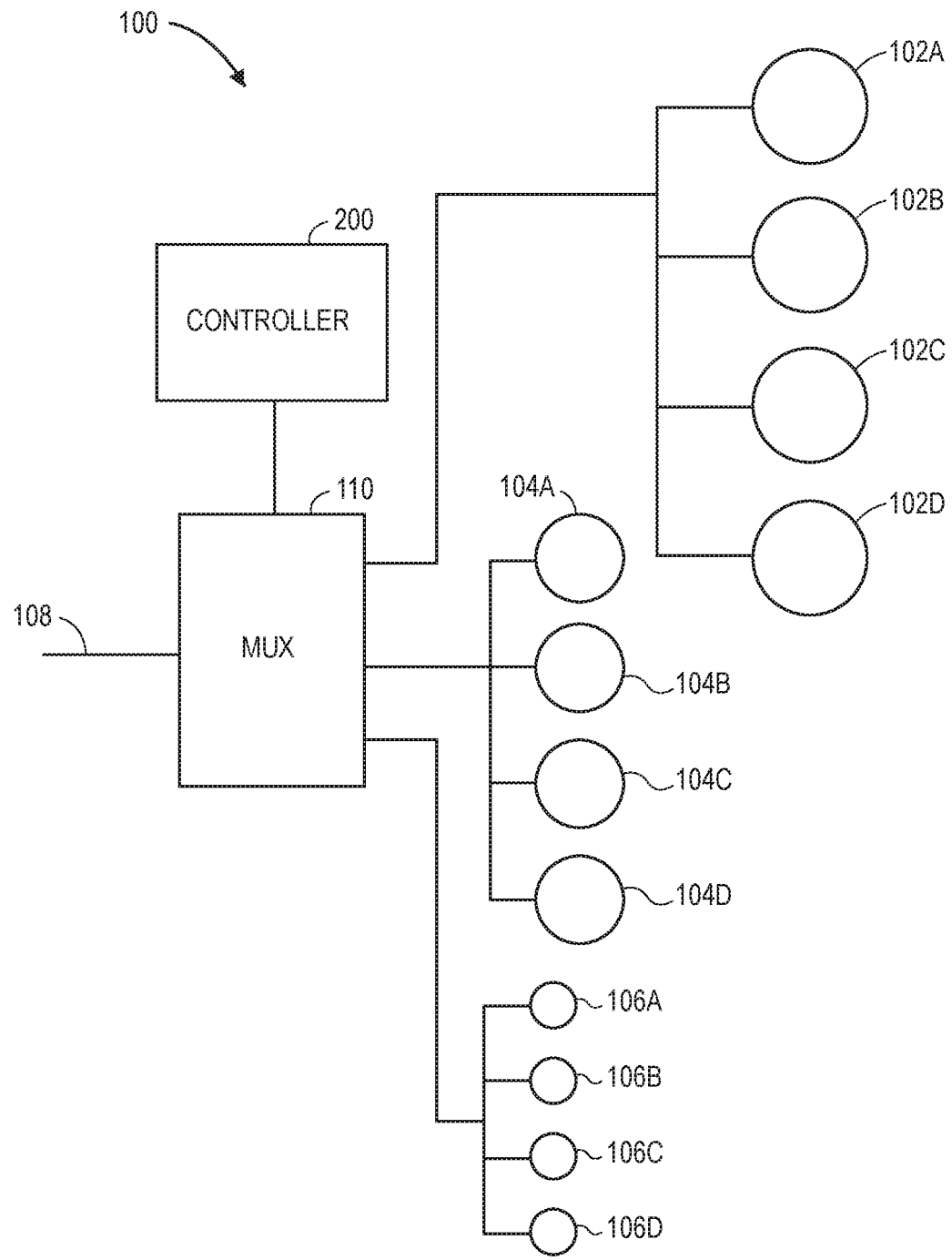
FIG. 3 is a block diagram illustrating a direction-finding antenna, such as the direction-finding antenna illustrated in FIG. 1, with multiplexed radiating elements, in accordance with one or more embodiments of this disclosure.
Figure 4:
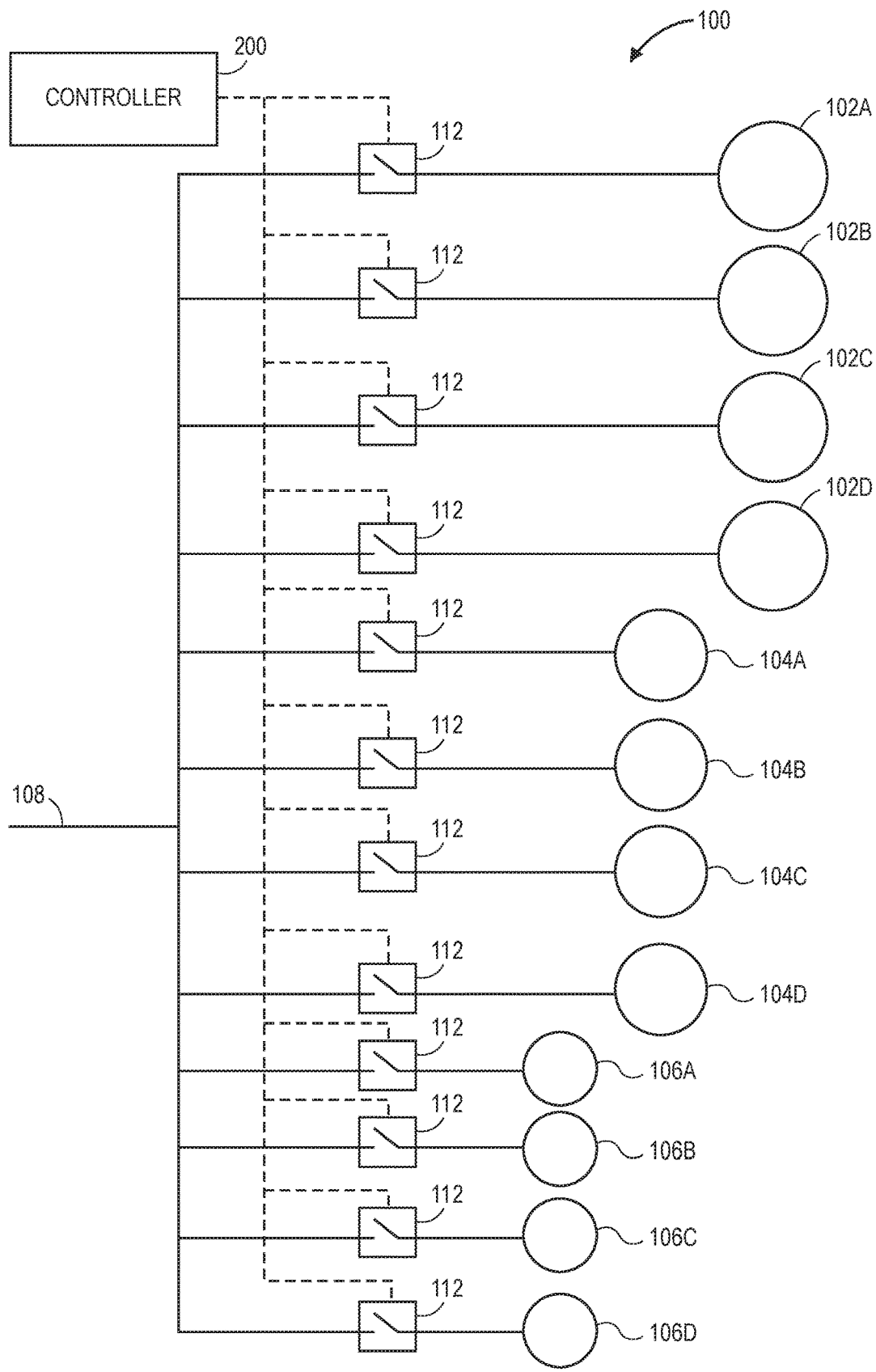
FIG. 4 is a block diagram illustrating a direction-finding antenna, such as the direction-finding antenna illustrated in FIG. 1, with electronically switched radiating elements, wherein the switches may include 2-way switches, where the "off" elements are switched to a terminating load, in accordance with one or more embodiments of this disclosure.

The radiating elements (e.g., elements 102, 104, 106, etc.) may be coupled to a common radio frequency (RF) feed line 108 using one or more multiplexers, switches, or the like. For example, FIGS. 3 and 4 illustrate embodiments of the direction-finding antenna 100 including at least one transmission line-based multiplexer 110 (FIG. 3) and/or switches 112 (FIG. 4) that are configured to selectively connect the RF feed line 108 with at least one selected set of radiating elements (e.g., (e.g., elements 102, 104, and/or 106) and/or at least one selected radiating element (e.g., element 102A, 102B, 102C, 102D, 104A, 104B, 104C, 104D, 106A, 106B, 106C, and/or 106D). In embodiments, the feed line 108 junction may be broadband matched. Alternatively, the direction-finding antenna 100 can have 4 parallel transceiver channels. Furthermore, each of the North (N)/South (S)/East (E)/West (W) legs may be commutated with a 4-way RF switch network. It is possible to have 4 or more individual transceiver channels to process the signal of each of the four quadrants of the antenna simultaneously.

As the frequency goes up, monopole and monopole-like elements become attractive as the ½ wave resonant length becomes smaller in terms of absolute dimension. In some embodiments, the different sets of radiating elements may include different types of radiating elements (per set). For example, the first set of radiating elements 102 can be a first type of antenna element, and the second set of radiating elements 104 can be a second type of antenna element different from the first type of antenna element. In this regard, the radiating elements may be mixed and matched different types of radiating elements for each concentric ring/loop of the direction-finding antenna 100 array, each for a specific frequency. In embodiments, the different types of antennas may include, but are not limited to, pure monopole (for higher frequency), printed monopole-like variants, ½ loops that can be ground-plane driven, dielectric resonator antennas, and/or microstrip type radiating elements.

It is noted that the discussion, thus far, implies vertical polarizations. However, horizontal polarization and elliptical/circular polarizations are also potentially applicable, depending on system needs and frequency ranges of interest.

As shown in FIG. 3, the transmission line-based multiplexer 110 may be coupled to the first set of radiating elements 102, the second set of radiating elements 104, the third set of radiating elements 106, and any additional sets of radiating elements. In embodiments, the transmission line-based multiplexer 110 is configured to selectively couple the first set of radiating elements 102, the second set of radiating elements 104, the third set of radiating elements 106, or any additional sets of radiating elements to the RF feed line 108. For example, the transmission line-based multiplexer 110 may be configured to sample all the radiating elements in a selected set simultaneously. In some embodiments, time-division multiplexing (TDM) is used to sample multiple frequency bands simultaneously, substantially simultaneously, or at least partially in parallel. For example, the transmission line-based multiplexer 110 can be configured to sample the first set of radiating elements 102 at a first time slot, the second set of radiating elements 104 at a second time slot, the third set of radiating elements 106 at a third time slot, and so forth. A receiver may then receive the signals from the different sets of radiating elements (via the RF feed line 108) and process each set of signals individually based on the dedicated time slots.

FIG. 4 illustrates another embodiment, where instead of or in addition to the transmission line-based multiplexer 110, the radiating elements (e.g., element 102A, 102B, 102C, 102D, 104A, 104B, 104C, 104D, 106A, 106B, 106C, 106D, etc.) may be coupled to switches 112 that are configured to selectively couple selected ones of the radiating elements to the RF feed line 108. For example, the switches 112 coupling radiating elements 102A, 102B, 102C, and 102D may be closed to connect the first set of radiating elements 102 to the RF feed line 108. Similarly, the switches 112 coupling radiating elements 104A, 104B, 104C, and 104D may be closed to connect the second set of radiating elements 104 to the RF feed line 108, or the switches 112 coupling radiating elements 106A, 106B, 106C, and 106D may be closed to connect the third set of radiating elements 106 to the RF feed line 108, and so forth. The switches may be 2-way switches, where the "off" elements are switched to a terminating load. In embodiments, the switches 112 may be or may include, but are not limited to, micro-electromechanical system (MEMS) switches, p-i-n junction (PIN) diodes, transistors (e.g., field-effect transistors (FETs)), or any combination thereof.

Having a switch 112 associated with each of the radiating elements (e.g., element 102A, 102B, 102C, 102D, 104A, 104B, 104C, 104D, 106A, 106B, 106C, 106D, etc.) also allows for individual connection of a radiating element or any selected group of the radiating elements to the RF feed line 108. For example, any of the radiating elements (e.g., element 102A, 102B, 102C, 102D, 104A, 104B, 104C, 104D, 106A, 106B, 106C, 106D, etc.) can be individually sampled, a set of elements (e.g., elements 102, 104, 106, etc.) can be sampled together, or any other grouping of elements may be sampled. In some embodiments, a timing schemed is used to sample multiple frequency bands simultaneously, substantially simultaneously, or at least partially in parallel. For example, the switches 112 can be configured to sample the first set of radiating elements 102 at a first time slot, the second set of radiating elements 104 at a second time slot, the third set of radiating elements 106 at a third time slot, and so forth. A receiver may then receive the signals from the different sets of radiating elements (via the RF feed line 108) and process each set of signals individually based on the dedicated time slots. Alternatively, or additionally, in the switched configuration, selected elements (e.g., element 102A, 102B, 102C, 102D, 104A, 104B, 104C, 104D, 106A, 106B, 106C, 106D, etc.) can be sampled at dedicated time slots and processed individually.

In some embodiments of the direction-finding antenna, the direction-finding antenna is a dielectric resonator antenna and/or a communications antenna. Furthermore, the direction-finding antenna may be a multi-function antenna that is reconfigurable between an omnidirectional mode and a commutated quadrant sectored N/S/E/W mode.

As shown in FIGS. 3 and 4, the direction-finding antenna 100 includes at least one controller 200 communicatively coupled to the one or more multiplexers 110 and/or the plurality of switches 112. In some embodiments (e.g., as shown in FIG. 3), the controller 200 may be configured to generate one or more control signals that cause the transmission line-based multiplexer 110 to selectively couple the first set of radiating elements 102, the second set of radiating elements 104, the third set of radiating elements 106, and/or one or more additional sets of radiating elements to the RF feed line 108. Or, in other embodiments (e.g., as shown in FIG. 4), the configured to generate one or more control signals that cause the switches 112 to selectively couple selected sets and/or individual radiating elements of the first set of radiating elements 102, the second set of radiating elements 104, the third set of radiating elements 106, and/or one or more additional sets of radiating elements to the RF feed line 108.

Figure 5:
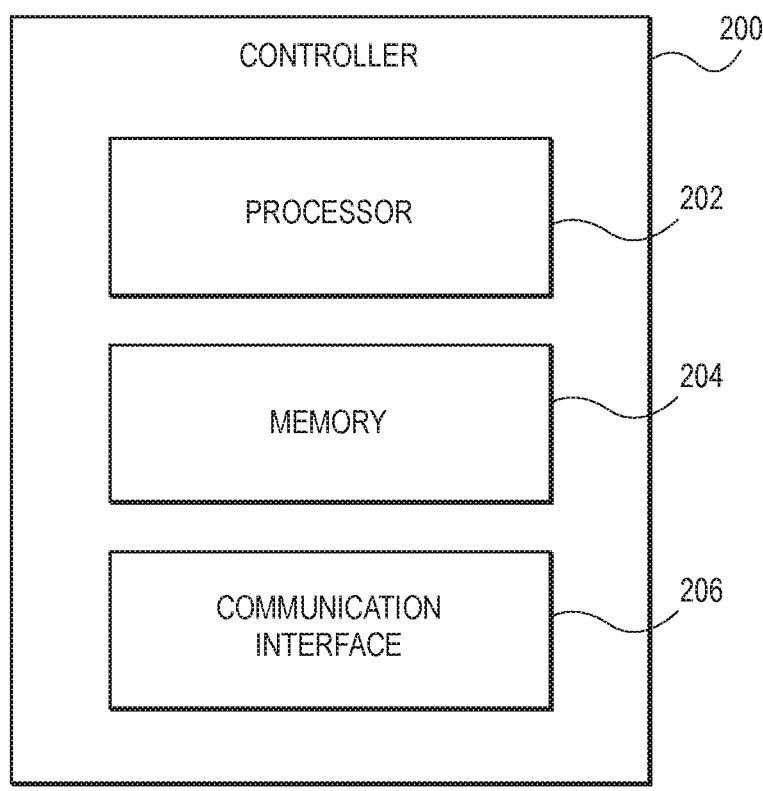
FIG. 5 is a block diagram illustrating a controller for a direction-finding antenna, such as the direction-finding antenna illustrated in FIG. 1, FIG. 3, FIG. 4, or any combination thereof, in accordance with one or more embodiments of this disclosure.

FIG. 5 illustrates an embodiment of the controller 200, which may include, but is not limited to, at least one processor 202, memory 204, and communication interface 206. The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices, system components (e.g., multiplexer 110, switches 112, etc.), and so forth via the communication interface 206. In embodiments, the communication interface 206 may include a transmitter, receiver, transceiver, physical connection interface, or any combination thereof.

Various embodiments of a direction-finding antenna 100 have been described with reference to FIGS. 1 through 5. However, in other embodiments, the direction-finding antenna 100 may be modified without deviating from the scope of this disclosure. For example, any of the components (e.g., radiating elements 102/104/106/etc., multiplexer 110, switches 112, controller 200, etc.) described herein may be implemented by a plurality of components. In this regard, any reference to "a" or "the" component should be understood as a reference to "one or more" of the same component.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A direction-finding antenna, comprising:
   a first set of radiating elements configured to radiate at a first wavelength ($\lambda_1$), wherein the first set of radiating elements defines a first circle having a first radius with a first phase center distance between $0.15\lambda_1$ and $0.20\lambda_1$;
   a second set of radiating elements configured to radiate at a second wavelength ($\lambda_2$) that is shorter than the first wavelength ($\lambda_1$), wherein the second set of radiating elements defines a second circle having a second radius with a second phase center distance between $0.15\lambda_2$ and $0.20\lambda_2$, the second radius of the second circle is smaller than the first radius of the first circle, and the second set of radiating elements includes smaller radiating elements than the first set of radiating elements, wherein the first circle and the second circle are concentric; and
   a transmission line-based multiplexer coupled to the first set of radiating elements and the second set of radiating elements, the transmission line-based multiplexer configured to selectively couple the first set of radiating elements or the second set of radiating elements to a radio frequency (RF) feed line,
   wherein the transmission line-based multiplexer is configured to sample all the radiating elements in a selected set simultaneously or at least partially in parallel.

2. The direction-finding antenna of claim 1, further comprising:
a third set of radiating elements configured to radiate at a third wavelength ($\lambda_3$) that is shorter than the second wavelength ($\lambda_2$), wherein the third set of radiating elements defines a third circle having a third radius with a third phase center distance between $0.15\lambda_3$ and $0.20\lambda_3$, the third radius of the third circle is smaller than the second radius of the second circle, and the third set of radiating elements includes smaller radiating elements than the second set of radiating elements.

3. The direction-finding antenna of claim 2, wherein the transmission line-based multiplexer is further coupled to the third set of radiating elements, and the transmission line-based multiplexer is configured to selectively couple the first set of radiating elements, the second set of radiating elements, or the third set of radiating elements to the RF feed line.

4. The direction-finding antenna of claim 3, further comprising:
at least one additional set of radiating elements configured to radiate at an additional wavelength ($\lambda_n$) that is shorter than the third wavelength ($\lambda_3$), wherein the additional set of radiating elements defines an additional circle having an additional radius with an additional phase center distance between $0.15\lambda_n$ and $0.20\lambda_n$, the additional radius of the additional circle is smaller than the third radius of the third circle, and the additional set of radiating elements includes smaller radiating elements than the third set of radiating elements.

5. The direction-finding antenna of claim 4, wherein the transmission line-based multiplexer is further coupled to the additional set of radiating elements, and the transmission line-based multiplexer is configured to selectively couple the first set of radiating elements, the second set of radiating elements, the third set of radiating elements, or the additional set of radiating elements to the RF feed line.

6. The direction-finding antenna of claim 1, wherein the radiating elements comprise circular disk (C-disk) antenna elements.

7. The direction-finding antenna of claim 1, wherein the radiating elements comprise monopole or monopole-like antenna elements.

8. The direction-finding antenna of claim 1, wherein the radiating elements comprise dielectric resonator antennas.

9. The direction-finding antenna of claim 1, wherein the first set of radiating elements comprises a first type of antenna element, and the second set of radiating elements comprises a second type of antenna element different from the first type of antenna element.

10. The direction-finding antenna of claim 1, wherein the direction-finding antenna is a communications antenna, and wherein the direction-finding antenna is reconfigurable between an omnidirectional mode and a commutated quadrant sectored N/S/E/W mode.

11. The direction-finding antenna of claim 1, wherein the transmission line-based multiplexer is configured to use time-division multiplexing (TDM) to sample multiple frequency bands simultaneously or at least partially in parallel.

12. The direction-finding antenna of claim 11, wherein the transmission line-based multiplexer is configured to sample the first set of radiating elements at a first time slot and the second set of radiating elements at a second time slot.

13. The direction-finding antenna of claim 1, wherein the transmission line-based multiplexer is configured to sample all the radiating elements in the selected set simultaneously.

14. A direction-finding antenna, comprising:
a first set of radiating elements configured to radiate at a first wavelength ($\lambda_1$), wherein the first set of radiating elements defines a first circle having a first radius with a first phase center distance between $0.15\lambda_1$ and $0.20\lambda_1$;
a second set of radiating elements configured to radiate at a second wavelength ($\lambda_2$) that is shorter than the first wavelength ($\lambda_1$), wherein the second set of radiating elements defines a second circle having a second radius with a second phase center distance between $0.15\lambda_2$ and $0.20\lambda_2$, the second radius of the second circle is smaller than the first radius of the first circle, and the second set of radiating elements includes smaller radiating elements than the first set of radiating elements, wherein the first circle and the second circle are concentric; and
a plurality of switches coupled to respective radiating elements of the first set of radiating elements and the second set of radiating elements, the plurality of switches configured to selectively couple selected radiating elements of the first set of radiating elements or the second set of radiating elements to a radio frequency (RF) feed line
wherein the plurality of switches is configured to sample all the radiating elements in a selected set simultaneously or at least partially in parallel.

15. The direction-finding antenna of claim 14, further comprising:
a third set of radiating elements configured to radiate at a third wavelength ($\lambda_3$) that is shorter than the second wavelength ($\lambda_2$), wherein the third set of radiating elements defines a third circle having a third radius with a third phase center distance between $0.15\lambda_3$ and $0.20\lambda_3$, the third radius of the third circle is smaller than the second radius of the second circle, and the third set of radiating elements includes smaller radiating elements than the second set of radiating elements.

16. The direction-finding antenna of claim 15, wherein the plurality of switches are further coupled to respective radiating elements of the third set of radiating elements, and the plurality of switches are configured to selectively couple selected radiating elements of the first set of radiating elements, the second set of radiating elements, or the third set of radiating elements to the RF feed line.

17. The direction-finding antenna of claim 16, further comprising:
at least one additional set of radiating elements configured to radiate at an additional wavelength ($\lambda_n$) that is shorter than the third wavelength ($\lambda_3$), wherein the additional set of radiating elements defines an additional circle having an additional radius with an additional phase center distance between $0.15\lambda_n$ and $0.20\lambda_n$, the additional radius of the additional circle is smaller than the third radius of the third circle, and the additional set of radiating elements includes smaller radiating elements than the third set of radiating elements, wherein the plurality of switches are further coupled to respective radiating elements of the additional set of radiating elements, and the plurality of switches are configured to selectively couple selected radiating elements of the first set of radiating elements, the second set of radiating elements, the third set of radiating elements, or the additional set of radiating elements to the RF feed line.

18. The direction-finding antenna of claim 14, wherein the plurality of switches comprise at least one of micro-electro-mechanical system (MEMS) switches, p-i-n junction (PIN) diodes, or transistors.

19. The direction-finding antenna of claim 14, wherein the plurality of switches is configured to use a timing scheme to sample multiple frequency bands simultaneously or at least partially in parallel.

20. The direction-finding antenna of claim 19, wherein the plurality of switches is configured to sample the first set of radiating elements at a first time slot and the second set of radiating elements at a second time slot.

\* \* \* \* \*